Dec. 31, 1968

L. FRIEDMAN 3,418,875

CONVERTED SQUARING SHEARS

Filed Sept. 12, 1966

INVENTOR
LEONARD FRIEDMAN

BY *Cullen, Sloman, & Cantor*

ATTORNEYS

United States Patent Office 3,418,875
Patented Dec. 31, 1968

3,418,875
CONVERTED SQUARING SHEARS
Leonard Friedman, 716 N. Hillcrest Drive,
Beverly Hills, Calif. 90210
Filed Sept. 12, 1966, Ser. No. 578,541
1 Claim. (Cl. 83—694)

ABSTRACT OF THE DISCLOSURE

A squaring shear having a vertically moving blade which in normal operation is straight and cooperates with a straight rearward edge of a shearing bed to define a straight shearing line. Complementary attachment means are provided for both the blade and the bed to allow for a cut of non-straight or patterned contour.

---

The present invention relates to a squaring shears normally used for cutting off unit lengths of sheet metal stock, usually from a roll fed into and over the bed of said shears and wherein the present squaring shears has been modified for the purpose of cutting pattern shapes.

Heretofore, when it is desired to cut pattern shapes there is normally employed a conventional heavy duty straight side press, which is extremely costly equipment.

It is an object of the present invention to modify the present squaring shears, normally designed for the cutting of squared off sections, wherein with the modifications hereunder set forth, pattern shapes may be cut off in a single or continuous operation as the stock is fed over the modified bed.

These and other objects will be seen from the following specification and claims in conjunction with the appended drawings in which:

It will be understood that the above drawing illustrates merely a preferred embodiment of the invention, and that other embodiments are contemplated within the scope of the claims hereinafter set forth.

Figure 1:
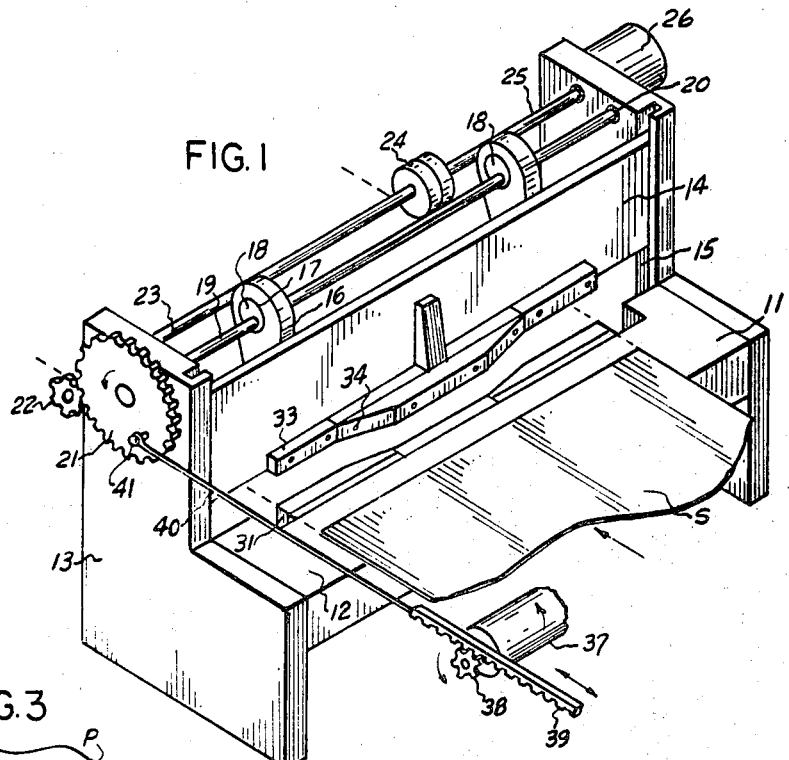
FIG. 1 is a front, perspective, schematic view of a squaring shears which has been modified for cutting pattern shapes and with the feed mechanism and stock fragmentarily shown.

Referring to the drawing, the present converted squaring shears shown in FIG. 1, includes the horizontally disposed bed 11 having a flat top work surface 12 and the upright base end supports 13 fixedly secured thereto.

The vertically movable head 14 is guided at its opposite ends within the upright channel guides formed in said end supports.

Figure 2:
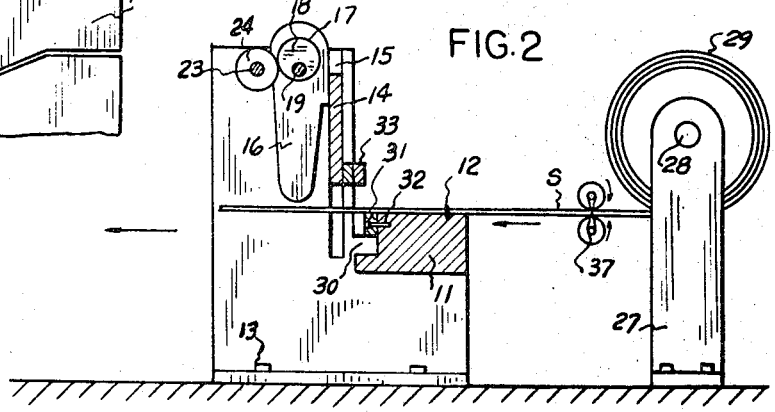
FIG. 2 is a vertical section thereof.

The conventional type of weights 16, FIG. 2, are fixedly secured to the rear surface of the head 14 and have circular transverse bores 17 therethrough receiving the conventional eccentric discs 18 which are eccentrically mounted upon the driven shaft 19 journalled through bearings 20 within the base end supports.

The gear wheel 21 fixedly secured to shaft 19 upon the exterior of the corresponding end support is in mesh with pinion 22 on the driveshaft 23, also journalled through the adjacent base end support 13.

The clutch assembly 24 connected with motor shaft 25 from motor 26 mounted upon the adjacent base end support provides the power for the reciprocating action of the head in a conventional manner.

By way of illustration there is schematically shown in FIGS. 1 and 2 a means by which the metal stock in coil form is fed continuously or intermittently to the modified squaring shears. Upon the upright support 27 suitably anchored to the floor surface and journalled at 28 is a continuous roll of sheet metal such as steel as at 29 which, by virtue of feedrolls 37 schematically shown, directs the metal stock in a horizontal direction over and onto the work surface 12 of bed 11 for projection relative to the vertically reciprocal head 14.

Schematically there is shown in FIG. 1 one form for effecting incremental longitudinal feed movements of the stock S over and onto bed 11.

The clutch pinion 38 is axially mounted upon feed roll 37, which may be suitably interconnected with a top feedroll such as shown in FIG. 2 and which has the characteristic of being idle mounted when the pinion is rotated clockwise, but which feeds the roller when the pinion is rotated counter-clockwise by the reciprocating rack bar 39 in mesh therewith.

The opposite end of the rack bar schematically shown at 40 is pivotally connected at 41 to the eccentric stud shaft mounted upon gear wheel 21. Accordingly, it is seen that upon continued rotation of the gear wheel 21 there will be longitudinal reciprocal movement of the rack gear 39 providing incremental and continuous feed movements of the rolls 37 for advancing the stock S into the path of the power operated head 14. Various details as to the construction of the shear, including stop mechanism, is omitted.

Modified bed

In the conversion of the present squaring shears the bed 11 is modified by providing at its forward edge a vertical recess defining a vertical slot 30 opening upwardly.

A series of cooperating square edge cutting die sections 31 of pre-determined irregular profile are nested within the slot 30 and fixedly secured to the bed by a series of fasteners 32.

It is noted that the exposed, vertical and horizontal surfaces of the respective die sections 31 meet in a line of irregular pattern shape which is coplanar with the stock support surface 12 of the bed.

A corresponding series of cooperating square edge cutting die sections 33 having a complemental profile are secured by fasteners 34 upon and laterally of head 14 adjacent its lower edge, FIG. 1, and are positioned so as to cooperatively register with and to move past the first die sections 31 on downward movement of said head.

Figure 3:
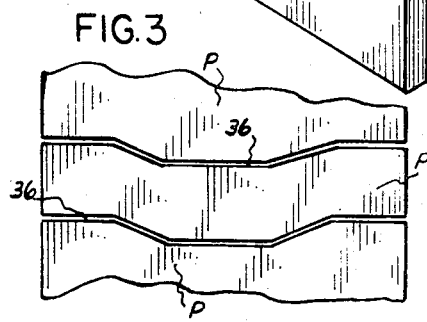
FIG. 3 is a fragmentary plan view illustrating the continuous pattern shapes cut by the present modified squaring shears.
Figure 4:
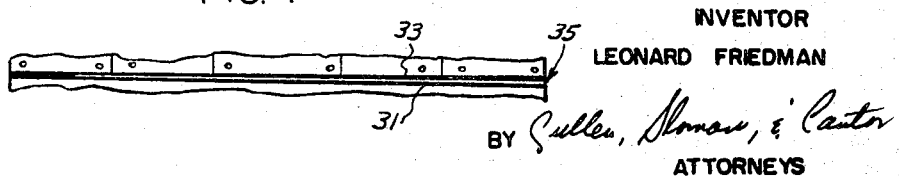
FIG. 4 is a schematic, fragmentary view indicating the shearing angle of the movable die sections with respect to the stationary die sections.

The corresponding outer and lower edges of the movable die section 33 define a cutting edge of the same profile which is arranged at a pre-determined small shearing angle 35, FIG. 4, with respect to the cutting edge of the stationary die section 31. Thus, the present modified shear has built thereinto the correct shearing angle and with the tolerances desired assured by the construction of the shear die blocks or die sections 31 and 33 for producing pattern shapes as indicated at P, FIG. 3, and wherein the forward and trailing surfaces transversely of the pattern sections P, as at 36, are pre-determined in form by the cooperating die blocks or die sections 31 and 33.

By the present construction the present conventional squaring shears may be modified for the purpose of cutting pattern shapes as shown in FIG. 3 in an intermittent or continuous manner. It is understood that any suitable form of feed mechanism may be employed and that the feed shown in FIG. 1 is schematic and illustrative of only one means for effecting incremental feed movement of the stock onto the bed of the shears.

The present invention and improvement is achieved by, primarily, the modification of the bed and by the application thereto of the corresponding, cooperating pattern die sections of irregular but pre-determined profile and incorporating thereinto a correct shear angle for production in a continuous manner of pattern shapes as desired in a single or continuous operation, something not previously known to have been done using shear tools.

Having described my invention reference should now be had to the following claims.

I claim:

1. In a squaring shear, a vertically moving blade whose lower forward edge is straight and sharp and is formed as a normal cutting edge and is intended to cooperate with a straight upper rearward edge of a bed to define a straight shearing line; the improvement comprising a modified bed and an attachment means to be attached to the blade for enabling the blade to cut a non-straight line;

said modified bed having a rearward slot at its rearward upper edge; and a stationary die mounted in said slot and having a rearward edge of non-straight or patterned contour;

said attachment means comprising a die removably mounted on the forward face of the blade at its normal cutting edge and having a forward edge of non-straight or patterned contour complementing the rearward edge of the stationary die, such blade die being attached to the blade for converting it as indicated, and removed to return the blade to its normal straight-cutting character, all without disturbing the blade or its mounting in its ways in the shear.

References Cited

UNITED STATES PATENTS

| 1,424,005 | 7/1922 | Drury | 83—694 X |
| 1,621,012 | 3/1927 | Head et al. | 83—694 X |
| 1,949,430 | 3/1934 | Murch | 83—917 X |
| 2,120,329 | 6/1938 | Henneke et al. | 83—636 X |

FOREIGN PATENTS 440,588   2/1927   Germany.

JAMES M. MEISTER, *Primary Examiner.*

U.S. Cl. X.R.

83—696, 698